US012761741B2

(12) United States Patent

Yuan

(10) Patent No.: US 12,761,741 B2

(45) Date of Patent: Oct. 13, 2026

(54) PHYSICAL BUTTON OPERATION METHOD AND HANDHELD ELECTRONIC DEVICE

(71) Applicant: ASUS GLOBAL PTE. LTD., Singapore (SG)

(72) Inventor: Zhe Yuan, Singapore (SG)

(73) Assignee: ASUS GLOBAL PTE. LTD., Singapore (SG)

( * ) Notice: Subject to any disclaimer, the term of this patent is extended or adjusted under 35 U.S.C. 154(b) by 36 days.

(21) Appl. No.: 18/906,140

(22) Filed: Oct. 3, 2024

(65) Prior Publication Data

US 2025/0155989 A1 May 15, 2025

(30) Foreign Application Priority Data

Nov. 10, 2023 (CN) ......................... 202311502902.0

(51) Int. Cl.
*G06F 3/023* (2006.01)
*G06F 3/02* (2006.01)

(52) U.S. Cl.
CPC .................................. *G06F 3/0227* (2013.01)

(58) Field of Classification Search
None
See application file for complete search history.

(56) References Cited

U.S. PATENT DOCUMENTS

| | | | | |
|---|---|---|---|---|
| 9,904,402 | B2 | 2/2018 | Chiu et al. | |
| 9,937,415 | B1 * | 4/2018 | Makuch | A63F 13/22 |
| 2015/0193011 | A1 * | 7/2015 | Shen | G06F 3/0202 345/168 |
| 2017/0351414 | A1 * | 12/2017 | Macho Cierna | G06F 3/04817 |
| 2020/0097098 | A1 * | 3/2020 | Zhu | G06F 1/1698 |
| 2021/0101075 | A1 * | 4/2021 | Lin | A63F 13/22 |

FOREIGN PATENT DOCUMENTS

| | | |
|---|---|---|
| CN | 109011561 | 12/2018 |
| CN | 112295218 | 2/2021 |
| TW | I544353 | 8/2016 |

* cited by examiner

*Primary Examiner* — Michael Sun
(74) *Attorney, Agent, or Firm* — JCIPRNET

(57) ABSTRACT

A handheld electronic device and a physical button operation method are provided. The physical button operation method is adapted to the handheld electronic device that includes a physical button. The method includes the following steps. When an application is executed, the physical button is switched from an initial control mode to an application control mode. When the physical button operates in the application control mode, a press event of the physical button is intercepted. The intercepted press event is mapped to a touch operation event. The application is controlled based on the touch operation event. As a result, the convenience and operational flexibility of operating the application can be significantly improved.

11 Claims, 9 Drawing Sheets

PHYSICAL BUTTON OPERATION METHOD AND HANDHELD ELECTRONIC DEVICE

CROSS-REFERENCE TO RELATED APPLICATION

This application claims the priority benefit of China application serial no. 202311502902.0, filed on Nov. 10, 2023. The entirety of the above-mentioned patent application is hereby incorporated by reference herein and made a part of this specification.

BACKGROUND

Technical Field

The disclosure relates to a handheld electronic device and a physical button operation method.

Description of Related Art

With the advancement of technology, powerful performance and abundant applications enable the handheld electronic device to become an indispensable item for modern daily lives of modern people. For instance, playing games on the handheld electronic device is already a very popular recreational activity. With the gradual performance improvement of the handheld electronic device, the gameplay and genre of games are gradually increasing. As a result, the player has to operate more and more virtual buttons on a gaming user interface. However, when holding a handheld electronic device, most players usually use only two fingers to click on the virtual buttons on the gaming user interface, but this kind of game operation method greatly limits the operational flexibility of game players.

SUMMARY

An embodiment of the disclosure provides a physical button operation method adapted to a handheld electronic device that includes a physical button, and the method includes the following steps. When an application is executed, the physical button is switched from an initial control mode to an application control mode. When the physical button operates in the application control mode, a press event of the physical button is intercepted. The intercepted press event is mapped to a touch operation event. The application is controlled based on the touch operation event.

An embodiment of the disclosure provides a handheld electronic device, which includes a physical button, a storage device, and a processor. The storage device records multiple modules, the processor is coupled to the physical button and the storage device and executes the modules to execute the following steps. When an application is executed, the physical button is switched from an initial control mode to an application control mode. When the physical button operates in the application control mode, a press event of the physical button is intercepted. The intercepted press event is mapped to a touch operation event. The application is controlled based on the touch operation event.

As mentioned above, in the embodiment of the disclosure, when holding the electronic device to execute a specific application, the operation mode of the physical button is switched from the initial control mode to the application control mode. When the physical button operates in the application control mode, the press event of the physical button is intercepted, and the press event is mapped to the touch operation event for controlling the application. Based on this, when a user presses the physical button in the application control mode, the original function that initially corresponds to the physical button is disabled, but the touch operation event may be triggered to control the application. Therefore, the convenience and the operational flexibility of operating the application can be significantly improved.

DESCRIPTION OF THE EMBODIMENTS

Figure 1:
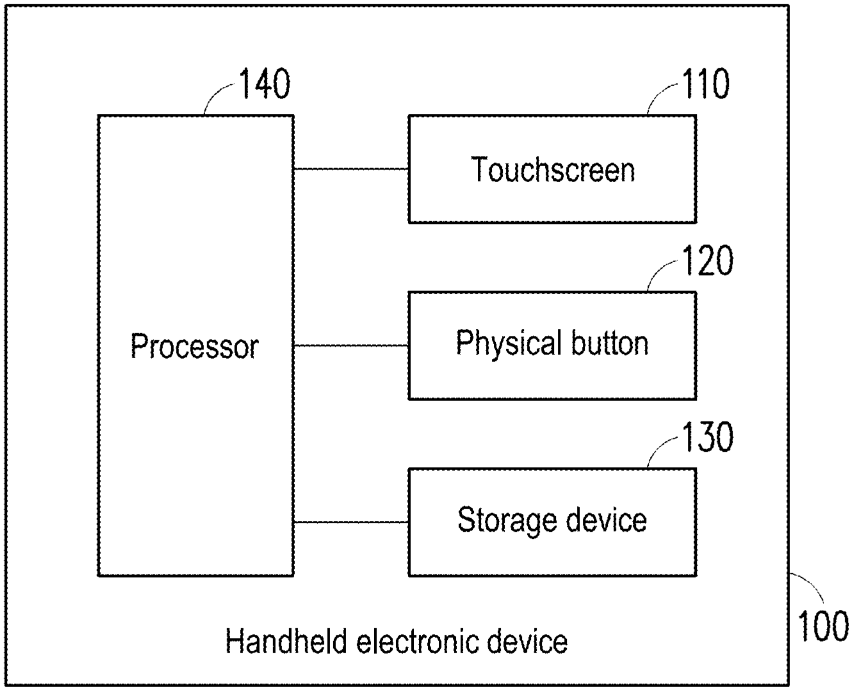
FIG. 1 is a schematic figure of a handheld electronic device according to an embodiment of the disclosure.

Reference will now be made to the exemplary embodiments of the disclosure in detail, examples of the exemplary embodiments are illustrated in the accompanying drawing. Whenever possible, the same reference numeral is used to represent the same or similar parts in the accompanying drawings and description.

Please refer to FIG. 1. A handheld electronic device 100 in the embodiment is a handheld electronic device such as a smart phone or a tablet computer which has the capability to execute an application, but is not limited by the disclosure. The handheld electronic device 100 includes a touchscreen 110, a physical button 120, a storage device 130, and a processor 140. The processor 140 is coupled to the touchscreen 110, the physical button 120, and the storage device 130, and the function thereof is stated below.

The touchscreen 110 is a display apparatus integrated with a touchscreen function, and a display is, for example, a liquid crystal display (LCD), a light-emitting diode (LED), a field emission display (FED), an organic light-emitting diode (OLED), or other types of displays, but is not limited by the disclosure.

Figure 2:
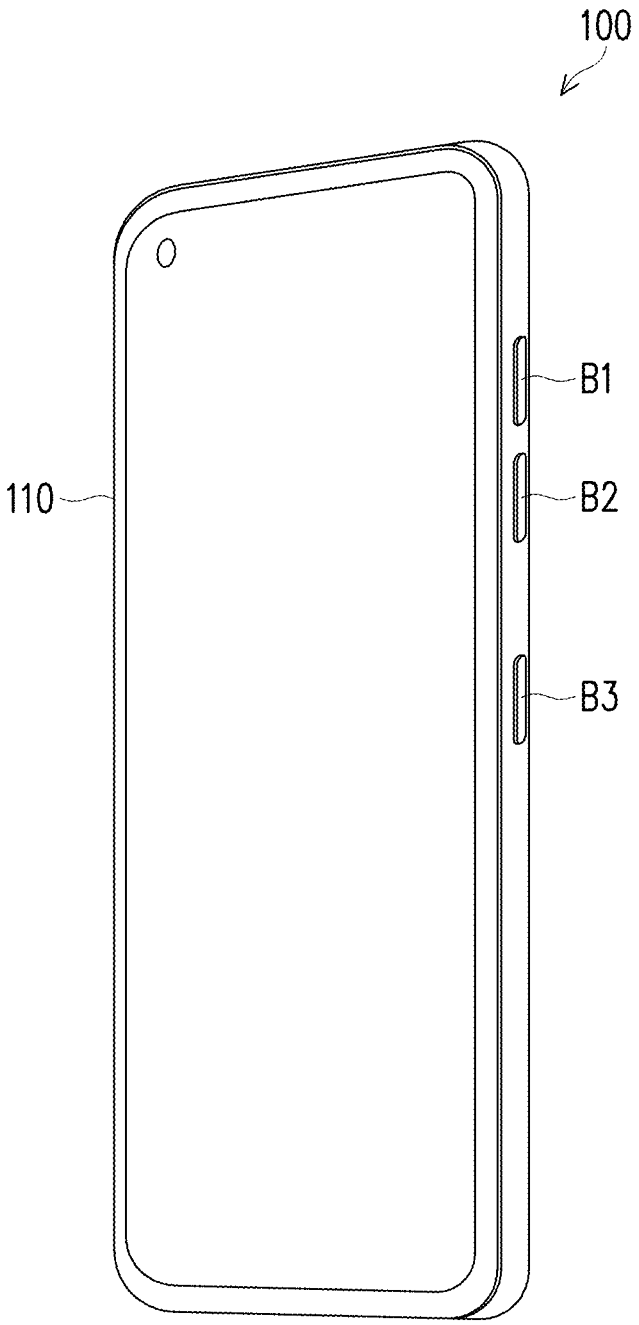
FIG. 2 is a schematic figure of a physical button according to an embodiment of the disclosure.

The physical button 120 may be installed on a lateral surface or a back surface opposite to a display side) of the handheld electronic device 100. The disclosure does not limit the installation location of the physical button 120. In general, taking the handheld electronic device 100 as a smart phone as an example, the physical button 120 may be a volume adjustment button, a power button, a lock button, etc. located on the lateral surface of the smart phone. Please refer to FIG. 2. For instance, the handheld electronic device 100 may include a physical button B1, a physical button B2, and a physical button B3 that are installed on the lateral surface of the device body. The physical button B1 and the physical button B2 may be, for example, a volume up button and a volume down button respectively. The physical button B3 may be, for example, a lock button.

The storage device 130 is used to store data such as files, images, commands, program codes, and software modules and may be any form of fixed or removable random access memory (RAM), read-only memory (ROM), flash memory, hard drive, other similar devices, integrated circuits, or a combination thereof.

The processor 140 is, for example, a central processing unit (CPU), an application processor (AP), other programmable general-purpose or specific-purpose microprocessors, digital signal processors (DSPs), programmable controllers, application specific integrated circuits (ASICs), programmable logic devices (PLDs), graphics processing unit (GPUs), other similar devices, or a combination of the devices. The processor 140 may execute program codes, software modules, commands, etc. recorded in the storage device 130 to implement a physical button operation method in the embodiment of the disclosure. The software module may be extensively interpreted as a command, a command set, a code, a program code, a program, an application, a software package, a thread, a procedure, a function, etc.

In general, the physical button 120 is used to trigger one or multiple preset original functions. Taking FIG. 2 for instance, the physical button B1 and the physical button B2 may trigger a volume adjustment function, and the physical button B3 may trigger a lock function or a power-on function. Note that in the embodiment of the disclosure, when the handheld electronic device 100 executes a specific application, the physical button 120 of the handheld electronic device 100 is switched from an initial control mode to an application control mode, and a press event received in response to a user pressing the physical button 120 is mapped to a touch operation event. When the user operates the application through the handheld electronic device 100, the application may reflect the touch operation event mapped by the press event, and execute a corresponding operation based on the touch operation event. Therefore, the physical button 120 may be switched from triggering the original function to being used to control the application, so as to increase the functionality of the physical button 120 and improve the convenience of operating the application.

Figure 3:
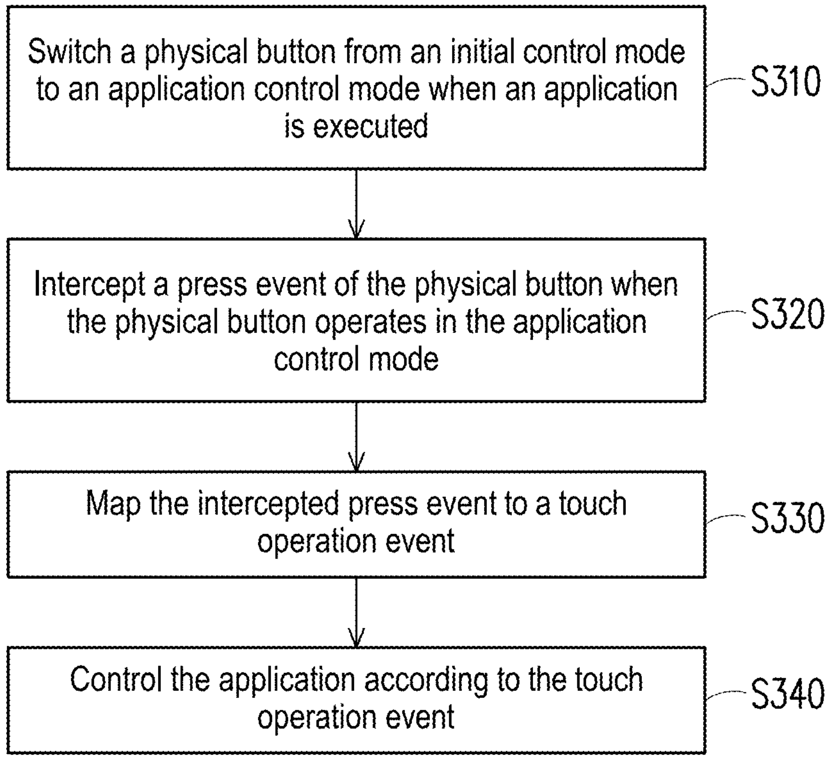
FIG. 3 is a flowchart of a physical button operation method according to an embodiment of the disclosure.

FIG. 3 is a flowchart of a physical button operation method according to an embodiment of the disclosure. Please refer to FIG. 1 and FIG. 3. The method in the embodiment is adapted to the handheld electronic device 100 in the above-mentioned embodiment. The detailed steps of the physical button operation method of the embodiment will be described below in conjunction with various components in the handheld electronic device 100.

In step 310, when an application is executed, the processor 140 switches the physical button 120 from an initial control mode to an application control mode. In different embodiments, the application may include a game application, a multimedia player application, a video application, or other types of applications, but is not limited by the disclosure. When the physical button 120 operates in the initial control mode, the physical button 120 may trigger an original function, and the original function is a preset button function. When the physical button 120 operates in the application control mode, the physical button 120 may trigger an application control function.

More specifically, in some embodiments, when the physical button 120 operates in the initial control mode, the processor 140 may execute the original function based on a press event of the physical button 120. The original function is a preset button function of the physical button 120. In an embodiment, the original function may include a volume control function. Correspondingly, the physical button 120 may include a volume control button. When the processor 140 executes the application, the physical button 120 may be switched from triggering the preset button function to triggering the application control function.

In step 320, when the physical button 120 operates in the application control mode, the processor 140 intercepts the press event of the physical button 120. More specifically, when a press operation of pressing the physical button 120 is detected, the processor 140 may receive a press event of the physical button 120. In the embodiment of the disclosure, when the physical button 120 operates in the application control mode, the processor 140 intercepts the press event of the physical button 120 to disable the preset button function that corresponds to the physical button 120.

In step 330, the intercepted press event is mapped to a touch operation event by the processor 140. Specifically, according to an operation mapping table that is predefined and recorded in the storage device 130, the processor 140 may map the intercepted press event to the touch operation event. The touch operation event may include a touch location, a touch gesture, etc. For instance, the touch operation event may be a clicking operation located at a screen location (X, Y). Alternatively, the touch operation event may be a swiping operation moving from a screen location (X1, Y1) to a screen location (X2, Y2). Alternatively, the touch operation event mapped by the press event may further include a dragging operation, a multi-touch operation, etc.

Furthermore, in some embodiments, the intercepted press event may also be mapped to multiple touch operation events in sequence. The mapping relationship between the press event and the touch operation even may be set by the user and recorded in the operation mapping table in the storage device 130. In some embodiments, the handheld electronic device 100 may obtain the touch operation event mapped by the press event through an operation record function (also known as a macro record function). In this way, different operation requirements of different users can be satisfied.

In step 340, the processor 140 controls the application based on the touch operation event. Specifically, after mapping the intercepted press event to the touch operation event, the processor 140 may control the application to execute a corresponding program operation based on the touch operation event and a program operation interface configuration of the application. For instance, the processor 140 may generate a game control command based on the touch operation event and a virtual button configuration of a gaming interface. In this way, a gaming program executes a corresponding gaming operation based on the game control command.

Figure 4:
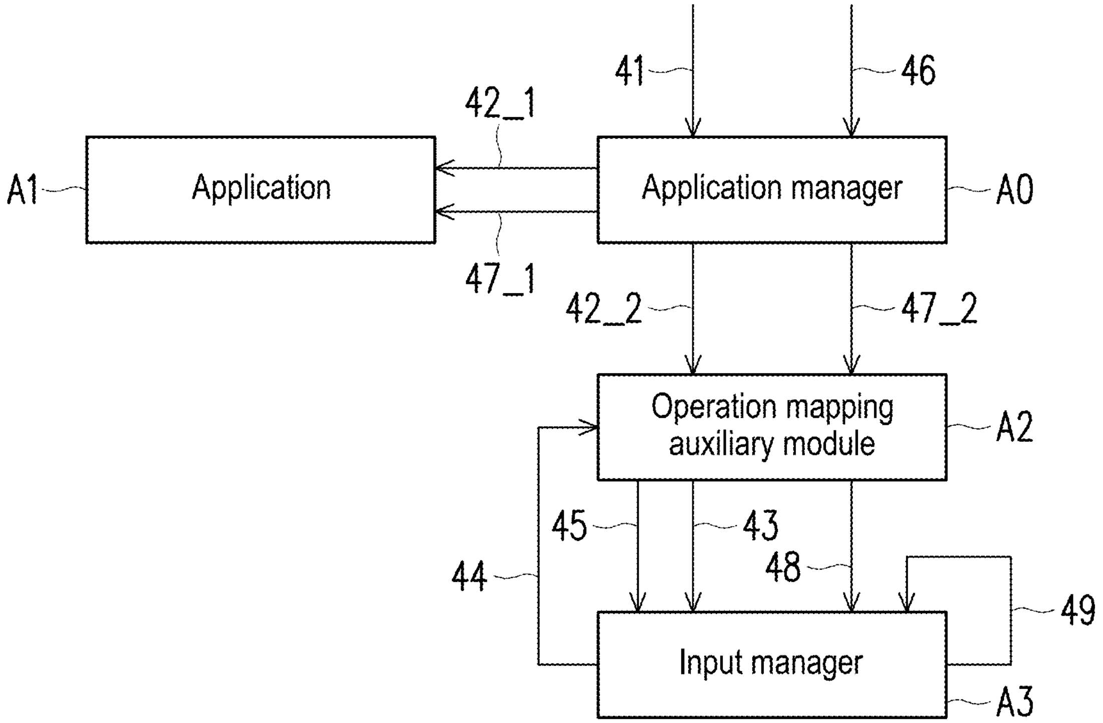
FIG. 4 is an operation chart of a physical button operation method according to an embodiment of the disclosure.

Referring to FIG. 4, in some embodiments, the processor 140 may execute an application manager A0, an application A1, an operation mapping auxiliary module A2, and an input manager A3 to implement the method shown in FIG. 3. The application manager A0, the application A1, the operation mapping auxiliary module A2, and the input manager A3 may be the software modules stored in the storage device 120.

The input manager A3 may provide an input manager service (IMS). The IMS may be used to manage the system input, such as touchscreen input, keyboard clicking, and sensor input. The input manager may obtain an input event from an input apparatus (such as the physical button 120, the touchscreen 110, or other input apparatuses), and assign the input event to a control target.

In an operation 41, the user sends a command to open the application A1. In an operation 42_1, the application manager A0 starts the application A1. In an operation 42_2, the application manager A0 sends a starting notice to the operation mapping auxiliary module A2. In an operation 43, the operation mapping auxiliary module A2 controls the input manager A3 to switch from an original mode to an application control mode. In an operation 44, when operating in the application control mode, the input manager A3 intercepts a press event of the physical button 120, and assigns a press event of the physical button 120 to the operation mapping auxiliary module A2. In an operation 45, the operation mapping auxiliary module A2 maps the press event of the physical button 120 to a touch operation event, and sends the touch operation event to the input manager A3. Afterwards, the application A1 may execute a corresponding operation based on the touch operation event. In an operation 46, the user sends a command to exit the application A1. In an operation 47_1, the application manager A0 exits the application. In an operation 47_2, the application manager A0 sends an exit notice to the operation mapping auxiliary module A2. In an operation 48, the operation mapping auxiliary module A2 controls the input manager A3 to switch to the original mode in response to the exit notice. In an operation 49, the input manager A3 stops intercepting the press event of the physical button 120.

Figure 5:
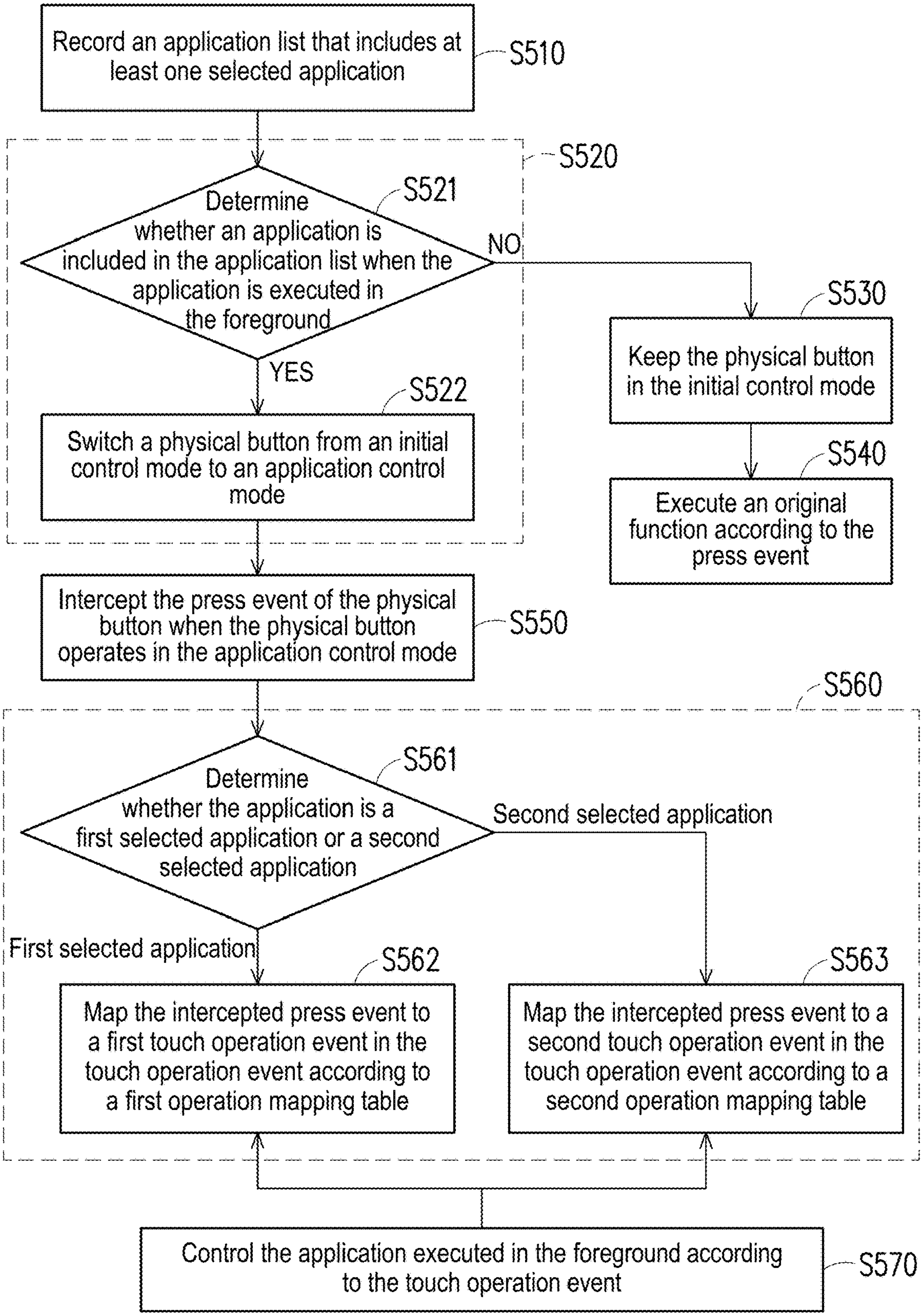
FIG. 5 is a flowchart of a physical button operation method according to an embodiment of the disclosure.

FIG. 5 is a flowchart of a physical button operation method according to an embodiment of the disclosure. Please refer to FIG. 1 and FIG. 5. The method in the embodiment is adapted to the handheld electronic device 100 in the above-mentioned embodiment. The detailed steps of the physical button operation method of the embodiment will be described below in conjunction with various components in the handheld electronic device 100.

In step 510, the processor 140 records an application list including at least one selected application. The setting of the selected application is decided by the user. When executing the selected application in the application list, the physical button 120 may be switched between an initial control mode and an application control mode.

In step 520, when the application is executed, the processor 140 switches the physical button 120 from the initial control mode to the application control mode. In some embodiments, step S520 may be implemented as step S521 to step S522.

In step 521, the processor 140 detects the application executed in the foreground. When the application is executed in the foreground, the processor 140 determines whether the application executed in the foreground is included in the application list.

If the determination of step S521 is negative, in step S530, when the application executed in the foreground is not included in the application list, the processor 140 keeps the physical button 120 in the initial control mode. Then, in step S540, when the physical button operates in the initial control mode, the processor 140 executes an original function based on a press event of the physical button 120.

If the determination of step S521 is positive, in step S550, when the application is included in the application list, the processor 140 switches the physical button 120 from the initial control mode to the application control mode. When the physical button 120 operates in the application control mode, the processor 140 intercepts the press event of the physical button 120.

In step 560, the intercepted press event is mapped to a touch operation event by the processor 140. In some embodiments, step S560 is implemented as step S561 to step S563.

In step 561, processor 140 determines whether the application is a first selected application or a second selected application in the application list. In step 562, when the application is the first selected application, the processor 140 maps the intercepted press event to a first touch operation event in the touch operation event according to a first operation mapping table of the first selected application. The first operation mapping table associated with the first selected application records the first touch operation event that corresponds to each of the at least one physical button 120.

In step 563, when the application is the second selected application, the processor 140 maps the intercepted press event to a second touch operation event in the touch operation event according to a second operation mapping table in the second selected application. The second operation mapping table associated with the second selected application records the second touch operation event that corresponds to each of the at least one physical button 120. The first touch operation event and the second touch operation event that correspond to the physical button 120 may be the same or different.

In other words, the press event of the same physical button 120 may be mapped to different touch operation events by the processor 140 for different applications. For instance, when the gaming program is executed in the foreground, the press event of the physical button 120 may correspond to the touch operation event (such as the touch operation event that corresponds to a first touch location) for operating a game. When the multimedia player application is executed in the foreground, the press event of the physical button 120 may correspond to the touch operation event (such as the touch operation event that corresponds to a second touch location) for operating a multimedia player.

In step S570, the processor 140 controls the application executed in the foreground based on the touch operation event.

Figure 6:
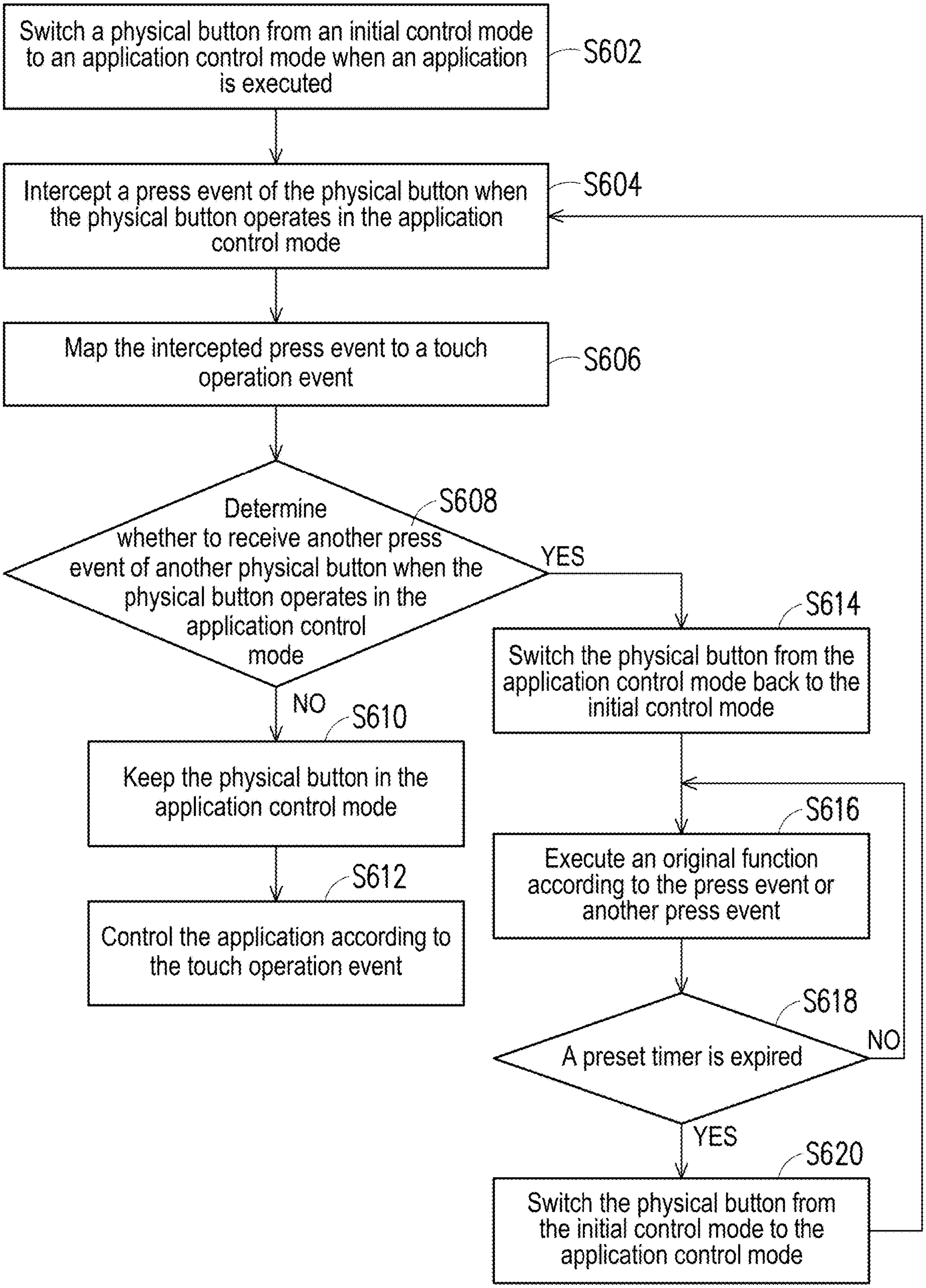
FIG. 6 is a flowchart of a physical button operation method according to an embodiment of the disclosure.

FIG. 6 is a flowchart of a physical button operation method according to an embodiment of the disclosure. Please refer to FIG. 1 and FIG. 6. The method in the embodiment is adapted to the handheld electronic device 100 in the above-mentioned embodiment.

In the embodiment, the handheld electronic device 100 may include the physical button 120 and another physical button. In some embodiments, the physical button 120 is one of a volume up button and a volume down button, and another physical button is the other one of the volume up button and the volume down button. The original function of the physical button 120 and another physical button is the volume control function. For convenience of describing the embodiment, the following will be exemplified by the physical button B1 and the physical button B2 of FIG. 2 for explanation. The physical button B1 is the volume up button, and the physical button B1 is the volume down button.

In step S602, when the application is executed, the processor 140 switches the physical button B1 from an initial control mode to an application control mode. In step S604, when the physical button B1 operates in the application control mode, the processor 140 intercepts a press event of the physical button B1. In step S606, the intercepted press event is mapped to a touch operation event by the processor 140. For implementation details of step S602 to step S606, reference may be made to the description of the above-mentioned embodiments.

In step S608, when the physical button B1 operates in the application control mode, the processor 140 determines whether to receive another press event of another physical button B2. If the determination of step S608 is negative, in step S610, the processor 140 keeps the physical button B1 in the application control mode. In step S612, the processor 140 controls the application based on the touch operation event mapped by the press event of the physical button B1.

If the determination of step S608 is positive, in step S614, when receiving another press event of another physical button B2, the processor 140 switches the physical button B1 from the application control mode back to the initial control mode. In step S616, the processor 140 executes the original function based on the press event of the physical button B1 or another press event of another physical button B2. More specifically, when the physical button B1 operates in the application control mode, the processor 140 may switch the physical button B1 back to triggering the original function in response to another physical button B2 being pressed.

In some embodiments, when the physical button B1 continues to operate in the initial control mode for a preset time period in response to another physical button B2 being pressed, the processor 140 switches the physical button B1 from the initial control mode to the application control mode. The preset time period may be set according to the actual requirement, but is not limited by the disclosure. The preset time period is, for example, set as 5 seconds, but not limited thereto.

In step S618 of the embodiment, the processor 140 starts a preset timer and determines whether the preset timer is expired, that is, whether the preset timer counts to a preset time length (for instance, n seconds). If the determination of step S608 is positive, in step S620, the processor 140 switches the physical button B1 from the initial control mode to the application control mode, and continues to execute step S604.

In some embodiments, after the physical button B1 switches from the application control mode back to the initial control mode in response to another physical button B2 being pressed, the preset timer is restarted whenever the processor 140 receives the press event of the physical button B1 or the physical button B2 After the press event of the physical button B1 or the physical button B2 is not received for a period of time, the preset timer continues to count until expiration, and the processor 140 switches the physical button B1 from the initial control mode to the application control mode.

For a clearer description of the disclosure, the following is exemplified by pressing a volume down button B2 and a volume up button B1 during a gaming process for explanation. In the exemplary embodiment in FIG. 7 and FIG. 8, a trigger function of the volume up button B1 may be switched between an original function and an application control function when a game application is executed.

Figure 7:
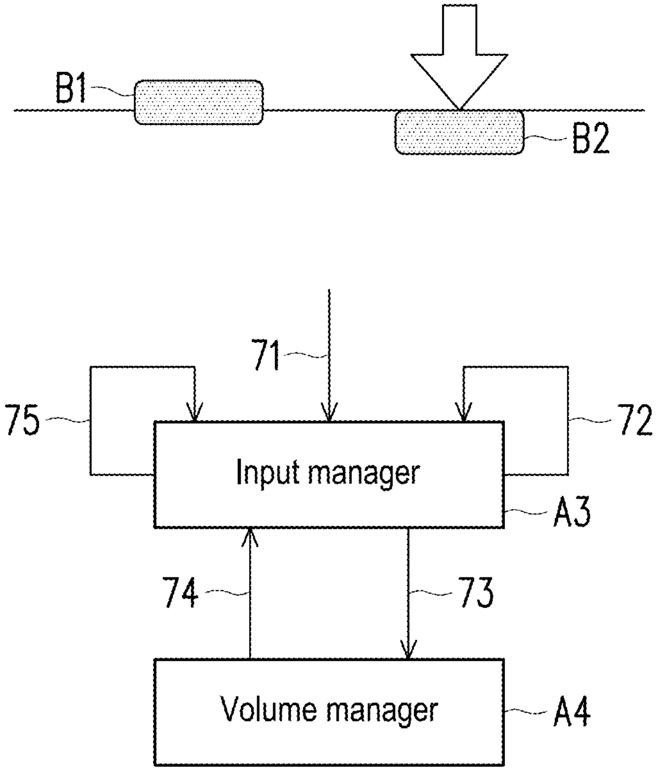
FIG. 7 is an operation chart of a physical button operation method according to an embodiment of the disclosure.

Referring to FIG. 7, in the embodiment, when the processor 140 executes the game application, the volume up button B1 may be switched from an initial control mode (that is, a volume control mode) to an application control mode (that is, a game control mode). When the volume up button B1 operates in the application control mode and the volume down button B2 is pressed by the user, in an operation 71, the input manager A3 receives a press event of the volume down button B2. In an operation 72, in response to the press event of the volume down button B2, the input manager A3 switches from the application control mode to the initial control mode. In an operation 73, the input manager A3 assigns the press event of the volume down button B2 to a volume manager A4, so that the volume manager A4 turns down the volume. In an operation 74, when the volume adjustment is finished, the volume manager A4 may notify the input manager A3. In an operation 75, the input manager A3 may switch from the initial control mode to the application control mode in response to the notice from the volume manager A4.

In other words, when the user plays the game with the handheld electronic device 100, the user may directly press the volume down button B2 to turn down the volume. Alternatively, when the user plays the game with the handheld electronic device 100, the user may first press the volume down button B2, so that the volume up button B1 is switched to the initial control mode, and then the user presses the volume up button B1 again to turn up the volume.

Figure 8:
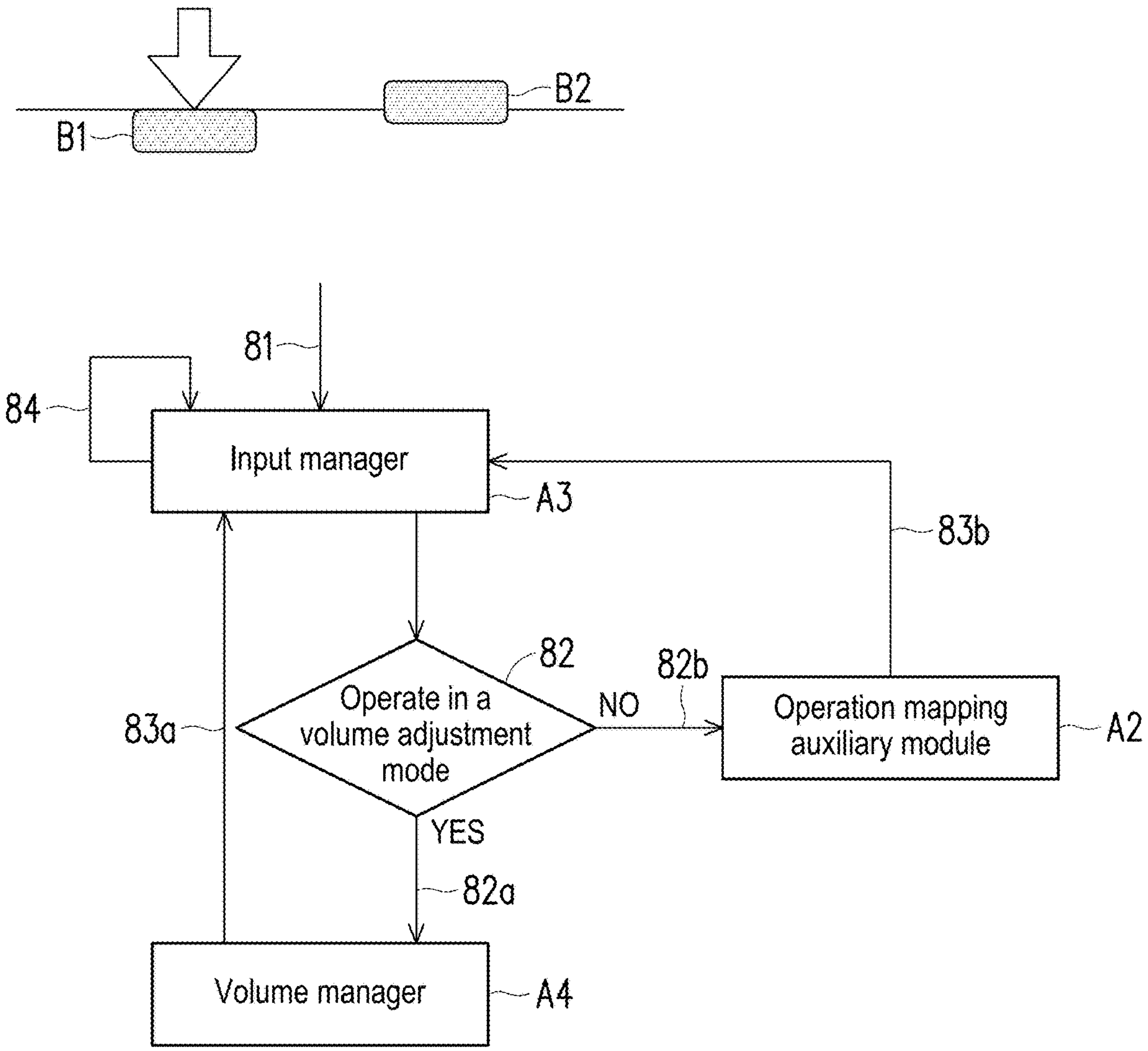
FIG. 8 is an operation chart of a physical button operation method according to an embodiment of the disclosure.

On the other hand, please refer to FIG. 8. In the embodiment, when the processor 140 executes the game application, the volume up button B1 may be switched from the initial control mode to the application control mode. When the volume up button B1 operates in the application control mode and the volume up button B1 is pressed by the user, in an operation 81, the input manager A3 receives the press event of the volume up button B1. As previously stated, the volume up button B1 may switch mode in response to the volume down button B2 being pressed or may be kept in the application control mode when the press event of the volume down button B2 is not received. In an operation 82, the input manager A3 determines whether the physical button currently operates in the volume control mode (that is, the initial control mode).

In an operation 82*a*, when the input manager A3 determines that the physical button currently operates in the volume control mode, the input manager A3 assigns the press event of the volume up button B1 to the volume manager A4, so that the volume manager A4 turns up the volume. In an operation 83*a*, when the volume adjustment is finished, the volume manager A4 may notify the input manager A3. In an operation 84, the input manager A3 may exit the volume control mode and switch from the initial control mode to the application control mode in response to the notice from the volume manager A4.

In an operation 82*b*, when the input manager A3 determines that the physical button currently does not operate in the volume control mode, the input manager A3 intercepts the press event of the volume up button B1 and assigns the press event of the volume up button B1 to the operation mapping auxiliary module A2, so that the operation mapping auxiliary module A2 maps the press event of the volume up button B1 to a touch operation event. In an operation 83*a*, the operation mapping auxiliary module A2 sends the touch operation event to the input manager A3. Afterwards, the game application may execute a corresponding operation according to the touch operation event assigned by the input manager A3.

Figure 9:
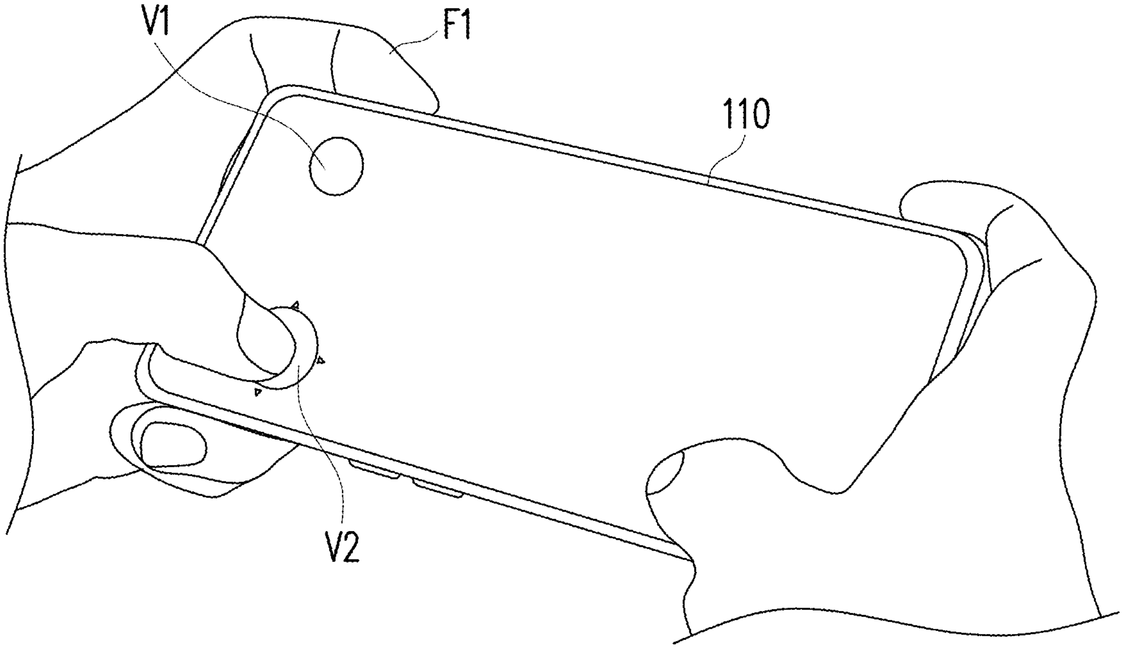
FIG. 9 is a scenario chart of a physical button operation method according to an embodiment of the disclosure.

Referring to FIG. 9, when the handheld electronic device 100 executes the game application, the volume up button B1 of the handheld electronic device 100 may be switched from the volume control mode (that is, the initial control mode) to the game control mode (that is, the application control mode). When the user plays the game with the handheld electronic device 100, a finger F1 of the user may issue a game control command to the game application through pressing the volume up button B1. For instance, the user pressing the press event of the volume up button B1 may be mapped to a touch operation event of clicking a virtual button V1. According to this, when a player holds the handheld electronic device 100 to play the game, in addition to using the thumb located on the touchscreen 110 to click a virtual button V2, the finger F1 (such as the index finger) that supports the handheld electronic device 100 may also operate the game through pressing the volume up button B1.

In conclusion, in the embodiments of the disclosure, when executing the application, the physical button of the handheld electronic device is switched between the initial control mode and the application control mode. Therefore, the user may press the physical button to control the application to execute the corresponding operation, which can increase the functionality of the physical button and improve the convenience of operation. In a gaming scenario, since the player using the handheld electronic device may play the game through more fingers, the flexibility and fun of game operation are significantly improved.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A physical button operation method adapted to a handheld electronic device comprising a physical button, the physical button operation method comprising:

switching the physical button from an initial control mode to an application control mode when an application is executed;

intercepting a press event of the physical button to disable a preset button function corresponding to the physical button when the physical button operates in the application control mode;

mapping the intercepted press event to a touch operation event comprising a touch location and a touch gesture; and controlling the application according to the touch operation event.

2. The physical button operation method according to claim 1, further comprising:

executing an original function according to the press event of the physical button when the physical button operates in the initial control mode.

3. The physical button operation method according to claim 2, wherein the original function comprises a volume adjustment function, and the physical button comprises a volume adjustment button.

4. The physical button operation method according to claim 2, wherein the step of switching the physical button from the initial control mode to the application control mode when the application is executed comprises:

detecting the application executed in a foreground;

determining whether the application is comprised in an application list when the application is executed in the foreground; and switching the physical button from the initial control mode to the application control mode when the application is comprised in the application list.

5. The physical button operation method according to claim 4, further comprising:

keeping the physical button in the initial control mode when the application is not comprised in the application list.

6. The physical button operation method according to claim 1, wherein the step of mapping the intercepted press event to the touch operation event comprises:

mapping the intercepted press event to a first touch operation event in the touch operation event according to a first operation mapping table of a first selected application when the application is the first selected application; and mapping the intercepted press event to a second touch operation event in the touch operation event according to a second operation mapping table of a second selected application when the application is the second selected application.

7. The physical button operation method according to claim 1, wherein the handheld electronic device further comprises another physical button, the physical button operation method further comprising:

determining whether to receive another press event of the another physical button when the physical button operates in the application control mode; and switching the physical button from the application control mode back to the initial control mode when receiving the another press event of the another physical button.

8. The physical button operation method according to claim 1, wherein after the step of switching the physical button from the application control mode back to the initial control mode when receiving the another press event of the another physical button, the physical button operation method further comprises:

executing an original function according to the press event of the physical button or the another press event of the another physical button.

9. The physical button operation method according to claim 8, wherein the physical button is one of a volume up button and a volume down button, the another physical button is other one of the volume up button and the volume down button, and the original function is a volume adjustment function.

10. The physical button operation method according to claim 7, wherein after the step of switching the physical button from the application control mode back to the initial control mode when receiving the another press event of the another physical button, the physical button operation method further comprises:

switching the physical button from the initial control mode to the application control mode after continuing to operate in the initial control mode for a preset time period.

11. A handheld electronic device, comprising:

a physical button;

a storage device, recording a plurality of modules;

a processor, coupled to the physical button and the storage device, executing the modules and configured to:

switch the physical button from an initial control mode to an application control mode when an application is executed;

intercept a press event of the physical button when the physical button operates in the application control mode;

map the intercepted press event to a touch operation event; and control the application according to the touch operation event, wherein the handheld electronic device further comprises another physical button, the physical button operation method further comprising:

determining whether to receive another press event of the another physical button when the physical button operates in the application control mode; and switching the physical button from the application control mode back to the initial control mode when receiving the another press event of the another physical button, wherein after the step of switching the physical button from the application control mode back to the initial control mode when receiving the another press event of the another physical button, the physical button operation method further comprises:

switching the physical button from the initial control mode to the application control mode after continuing to operate in the initial control mode for a preset time period.

* * * * *